US011180386B1

(12) United States Patent
Wegner

(10) Patent No.: US 11,180,386 B1
(45) Date of Patent: Nov. 23, 2021

(54) PROCESS FOR REGENERATING RESIN IN AN ION EXCHANGE VESSEL

(71) Applicant: Paul Charles Wegner, San Carlos, CA (US)

(72) Inventor: Paul Charles Wegner, San Carlos, CA (US)

( * ) Notice: Subject to any disclaimer, the term of this patent is extended or adjusted under 35 U.S.C. 154(b) by 0 days.

(21) Appl. No.: 16/790,966

(22) Filed: Feb. 14, 2020

Related U.S. Application Data

(60) Division of application No. 16/356,036, filed on Mar. 18, 2019, now Pat. No. 10,604,424, which is a continuation of application No. 15/618,204, filed on Jun. 9, 2017, now Pat. No. 10,252,921.

(60) Provisional application No. 62/392,710, filed on Jun. 9, 2016.

(51) Int. Cl.
| | |
|---|---|
| *C02F 1/42* | (2006.01) |
| *C02F 1/52* | (2006.01) |
| *C02F 1/68* | (2006.01) |
| *B01J 49/60* | (2017.01) |
| *C02F 1/12* | (2006.01) |
| *B01D 9/00* | (2006.01) |
| *C02F 101/10* | (2006.01) |
| *C02F 103/06* | (2006.01) |
| *C02F 103/10* | (2006.01) |

(52) U.S. Cl.
CPC .............. *C02F 1/42* (2013.01); *B01D 9/0027* (2013.01); *B01J 49/60* (2017.01); *C02F 1/12* (2013.01); *C02F 1/52* (2013.01); *C02F 1/68* (2013.01); *B01D 2009/0086* (2013.01); *C02F 2001/5218* (2013.01); *C02F 2101/108* (2013.01); *C02F 2103/06* (2013.01); *C02F 2103/10* (2013.01); *C02F 2303/16* (2013.01)

(58) Field of Classification Search
CPC ...... C02F 1/04; C02F 1/52; C02F 1/68; C02F 1/12; C02F 2101/108; C02F 2001/5218; C02F 2303/16; C02F 2103/06; C02F 2103/10; B01J 49/60; B01D 9/0027; B01D 2009/0086
USPC .......................................................... 521/26
See application file for complete search history.

(56) References Cited

U.S. PATENT DOCUMENTS

| | | | |
|---|---|---|---|
| 5,055,201 A | 10/1991 | Wegner | |
| 5,078,900 A | 1/1992 | Wegner | |
| 5,095,926 A | 3/1992 | Wegner | |
| 5,811,012 A * | 9/1998 | Tanabe | C02F 1/42 |
| | | | 210/669 |
| 5,998,640 A | 12/1999 | Haefele et al. | |
| 6,247,480 B1 | 6/2001 | Wegner | |
| 7,108,792 B2 | 9/2006 | Wegner | |
| 7,399,366 B1 | 7/2008 | Wegner et al. | |
| 7,413,084 B2 | 8/2008 | Wegner | |
| 7,562,664 B2 | 7/2009 | Wegner et al. | |
| 8,226,820 B1 | 7/2012 | Wegner | |
| 8,808,547 B2 * | 8/2014 | Pudvay | B01D 21/01 |
| | | | 210/670 |
| 9,670,075 B1 | 6/2017 | Wegner | |
| 9,902,628 B2 * | 2/2018 | Broschek Santelices | ................... |
| | | | C02F 1/42 |
| 2002/0056690 A1 | 5/2002 | Wegner | |
| 2002/0102229 A1 | 8/2002 | Wegner | |
| 2003/0151024 A1 | 8/2003 | Wegner | |
| 2004/0142834 A1 | 7/2004 | Wegner | |
| 2005/0065052 A1 | 3/2005 | Wegner | |
| 2005/0142096 A1 | 6/2005 | Wegner | |
| 2005/0189301 A1 | 9/2005 | Wegner et al. | |
| 2005/0194319 A1 | 9/2005 | Wegner | |
| 2005/0263740 A1 | 12/2005 | Wegner | |
| 2006/0081503 A1 | 4/2006 | Wegner | |
| 2008/0060978 A1 | 3/2008 | Wegner | |
| 2008/0272037 A1 | 11/2008 | Wegner et al. | |
| 2008/0296232 A1 | 12/2008 | Wegner | |
| 2009/0057231 A1 * | 3/2009 | Schelhaas | ................. C08F 8/24 |
| | | | 210/681 |
| 2015/0053620 A1 * | 2/2015 | Suri | ......................... C02F 1/285 |
| | | | 210/670 |

FOREIGN PATENT DOCUMENTS

| | | | |
|---|---|---|---|
| JP | 56-018792 A | * | 2/1981 |
| JP | 1956-18792 A | * | 2/1981 |
| JP | 2001219163 A | * | 8/2001 |
| JP | 2002035609 A | * | 2/2002 |

OTHER PUBLICATIONS

Nadav "Boron removal from seawater reverse osmosis permeate utilizing selective ion exchange resin", Desalination (1999), 124(1-3), 131-135 (Year: 1999).*

(Continued)

*Primary Examiner* — Michael M. Bernshteyn
(74) *Attorney, Agent, or Firm* — Head, Johnson, Kachigian & Wilkinson, PC

(57) ABSTRACT

A process and apparatus for enhanced boron removal from water. The process includes the steps of reacting potassium carbonate or ammonium carbonate with calcium borate in a stream of feed water to form a stream having calcium carbonate and potassium borate salt or ammonium borate salt. The stream having calcium carbonate and potassium borate or ammonium borate is introduced to an ion exchange vessel containing resin having methylglucamine in salt form with potassium carbonate or sodium carbonate to form borate and potassium sulfate or sodium sulfate. The resin in the ion exchange vessel is periodically regenerated.

5 Claims, 5 Drawing Sheets

(56) References Cited

OTHER PUBLICATIONS

Wilcox et al. "Boron removal from high-purity water by selective ion exchange", Ultrapure Water (2000), 17(6), 40-51. (Year: 2000).*
Wilcox et al. "Boron removal from high-purity water by selective ion exchange", Ultrapure Water (2000), 17(6), 40, 42-43, 45-46, 48-51, (Year: 2000).

* cited by examiner

PROCESS FOR REGENERATING RESIN IN AN ION EXCHANGE VESSEL

CROSS REFERENCE

This application is a divisional of U.S. patent application Ser. No. 16/356,036, filed Mar. 18, 2019, which is a continuation of U.S. patent application Ser. No. 15/618,204, filed Jun. 9, 2017, now U.S. Pat. No. 10,252,921, which claims priority to and the benefit of U.S. Provisional Patent Application Ser. No. 62/392,710, filed Jun. 9, 2016, each of which is incorporated herein by reference in its entirety.

BACKGROUND OF THE INVENTION

Field of the Invention

The present invention is directed to an enhanced method or process to remove boron from water utilizing an unpressurized, open ion exchange resin vessel. In addition, the present invention provides a process or method for regeneration of the resin utilized in the boron removal process and provides an ambient temperature process and apparatus for concentration of the regeneration output.

Description of the Related Art

Agriculture, such as orchards and vineyards, requires vast amounts of water for irrigation. Irrigation demand peaks at various times, such as in mid-summer. While trace amounts of boron are known to promote plant growth, excessive boron levels in water are known to be toxic to plants. Some normal irrigation water sources, such as well water, contain high levels of boron. In addition, excessive boron in potable water is undesirable. Indeed, some jurisdictions or areas are considering boron limits in drinking water.

Desalinated water from oil and gas well production and from seawater desalination reverse osmosis is especially high in boron content. It is desirable to desalinate oil well production water in order to minimize deep well injection of this water. Therefore, it is also desirable to remove boron from the water both quickly and economically.

Existing processes and procedures for boron removal from water are considered prohibitively expensive for many applications. Known boron removal resin is expensive, so maximizing boron loading capacity and flow through ion exchange resin beds is important.

Various known prior art approaches to boron removal from water are as follows:

Reverse Osmosis

In the case of reverse osmosis, the high volume of reject (retentate) water is expensive to transport and dispose of in deep injection wells or other means. Reverse osmosis is nonselective, so all the salt is removed. This limits the yield of product water. The pH must be increased before reverse osmosis to remove sufficient amounts of boron from the water, which increases the salt level of reject water even more. The product (permeate) water is too alkaline for many uses. Therefore, acid must be added to restore a proper pH for irrigation and other uses.

Ion Exchange

Boron selective ion exchange resin is expensive and has relatively low loading capacity. Loading capacity can be compromised by the presence of various chemicals in the source water. In addition, the standard regeneration process is a two-step process which requires regeneration with acid followed by regeneration with caustic. The two-step process doubles the regeneration time. Since many water sources contain carbonates, the standard downward flow acid regeneration compromises boron removal, due to $CO_2$ gas release into the resin bed during regeneration. This limits acid access to the resin. The resulting regeneration waste is a dilute mixture of sodium chloride, boric acid and sodium borate. This mixture does not have a commercial value and is considered a hazardous liquid waste, which is expensive to transport and dispose of. The volume of regeneration waste is too expensive to concentrate by conventional means, such as membranes or common energy intensive evaporators.

Pressurized Resin Vessels

Since the resin is expensive it is desirable to have large diameter vessels with minimal resin depth to maximize resin loading capacity, while minimizing pressure drop across the resin bed during service mode. However, large diameter pressure vessels are expensive, while multiple small vessels are complex to operate and require several valves.

Evaporation

The evaporation of water with high salt content is an energy intensive process. The use of solar ponds is an energy free method; however, the average evaporation rate is quite slow at 0.006 to 0.009 inches per hour. A 10 ft. diameter pond would have an evaporation rate of 0.3 to 0.5 gallons per hour.

Multiple effect evaporators are more energy efficient to operate but require expensive equipment. Similarly, vapor recompression requires expensive equipment and requires significant mechanical energy. Neither of these methods performs well when evaporating liquids to solids.

There still remains a need for a cost efficient high-volume process to remove boron from water.

Accordingly, it is a principal object and purpose of the present invention to provide an enhanced process and apparatus for boron removal from water.

It is a further object and purpose of the present invention to regenerate boron removal resin.

It is a further object and purpose of the present invention to provide a process and apparatus to concentrate boron in a liquid stream.

SUMMARY OF THE INVENTION

The present invention is directed to a process and an apparatus for enhanced boron removal from feed water. In one preferred embodiment, the process includes the steps of reacting potassium carbonate or ammonium carbonate with calcium borate in a stream of feed water in order to form a stream having calcium carbonate and potassium borate salt or ammonium borate salt. The stream having the calcium carbonate and potassium borate or ammonium borate is introduced into an ion exchange vessel through a diffuser screen. The vessel contains a macroporous polystyrene resin having methylglucamine in salt form and potassium carbonate or sodium carbonate in order to form borate and potassium sulfate or sodium sulfate.

The resin in the ion exchange vessel is periodically regenerated while in the vessel. A level of liquid is maintained in the ion exchange vessel having resin. Acid is pumped into the liquid while recirculating to a base of the vessel in order to percolate the acid through the resin. Carbon dioxide bubbles which are formed thereby are removed from a top of the vessel. The liquid having borate is thereafter removed to a boron tank. Fresh water is introduced to the ion exchange vessel and at least a portion of the liquid is directed to a recycle tank.

The borate in the liquid stream which has been delivered to the boron storage tank may be concentrated or evaporated. The liquid containing borate is pumped from the boron storage tank to a cooling tower. The liquid is thereafter sprayed through a nozzle or nozzles from above the cooling tower. Ambient air is drawn upward through the cooling tower by action of a fan. Concentrated liquid falls by gravity back into the boron tank. The higher density liquid falls toward the base of the tank while the lower density material remains or migrates to the top of the tank. Borate is concentrated along with borate crystals at a base of the tank.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
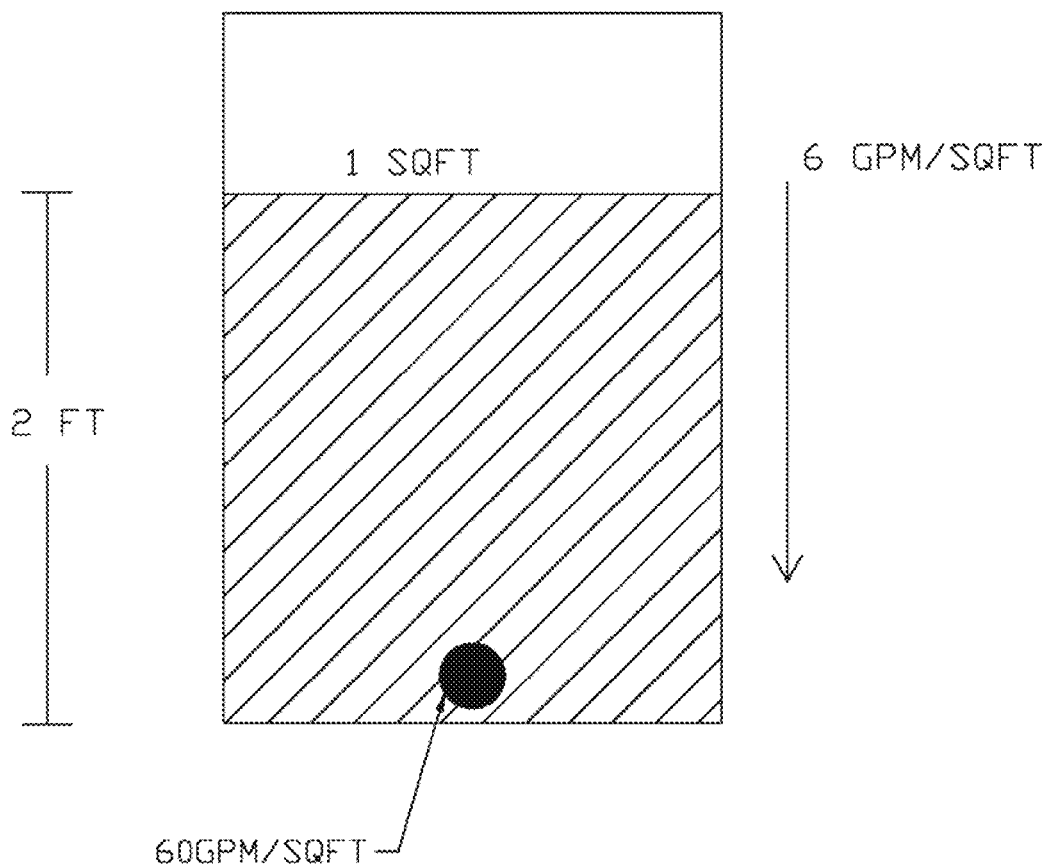
FIG. 1 illustrates a sectional view of a prior art ion exchange vessel.

Agricultural irrigation requires very large water flows. In order to remove chemicals such as boron, this translates into many small ion exchange pressure vessels, since large diameter pressure vessels are expensive. The management and control of many small vessels requires an extensive network of valves. At high flow rates, the pressure drop across prior art ion exchange vessels can exceed 10 PSI, which makes an open ion exchange vessel appear impracticable The large pressure drop is mostly due to the large increase in water velocity past the resin as it approaches the collector at the bottom of the ion exchange vessel. For example, see Prior Art in FIG. 1. The flow rate across the resin bed is 6 gpm/sqft, while the flow across the resin near the collector is 60 gpm/sqft. Ninety-percent of the pressure drop occurs across the collector. Due to the high cost of pressure vessels, greater resin depths are favored, which also contributes to the high pressure drop across the resin vessel. See Prior Art in FIG. 1.

Figure 2:
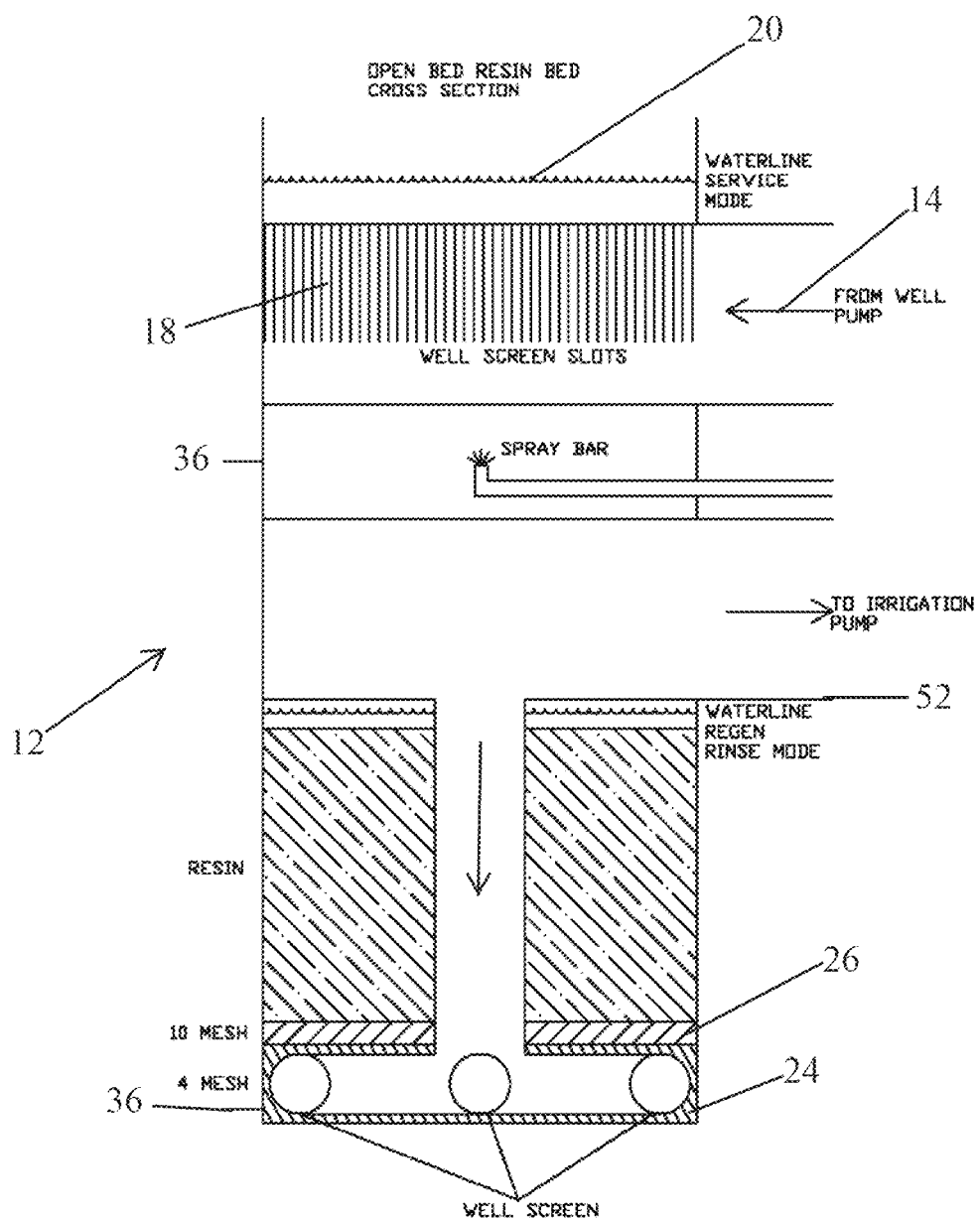
FIG. 2 illustrates a sectional view of an ion exchange vessel for use in an apparatus and process for enhancing boron removal of the present invention.
Figure 3:
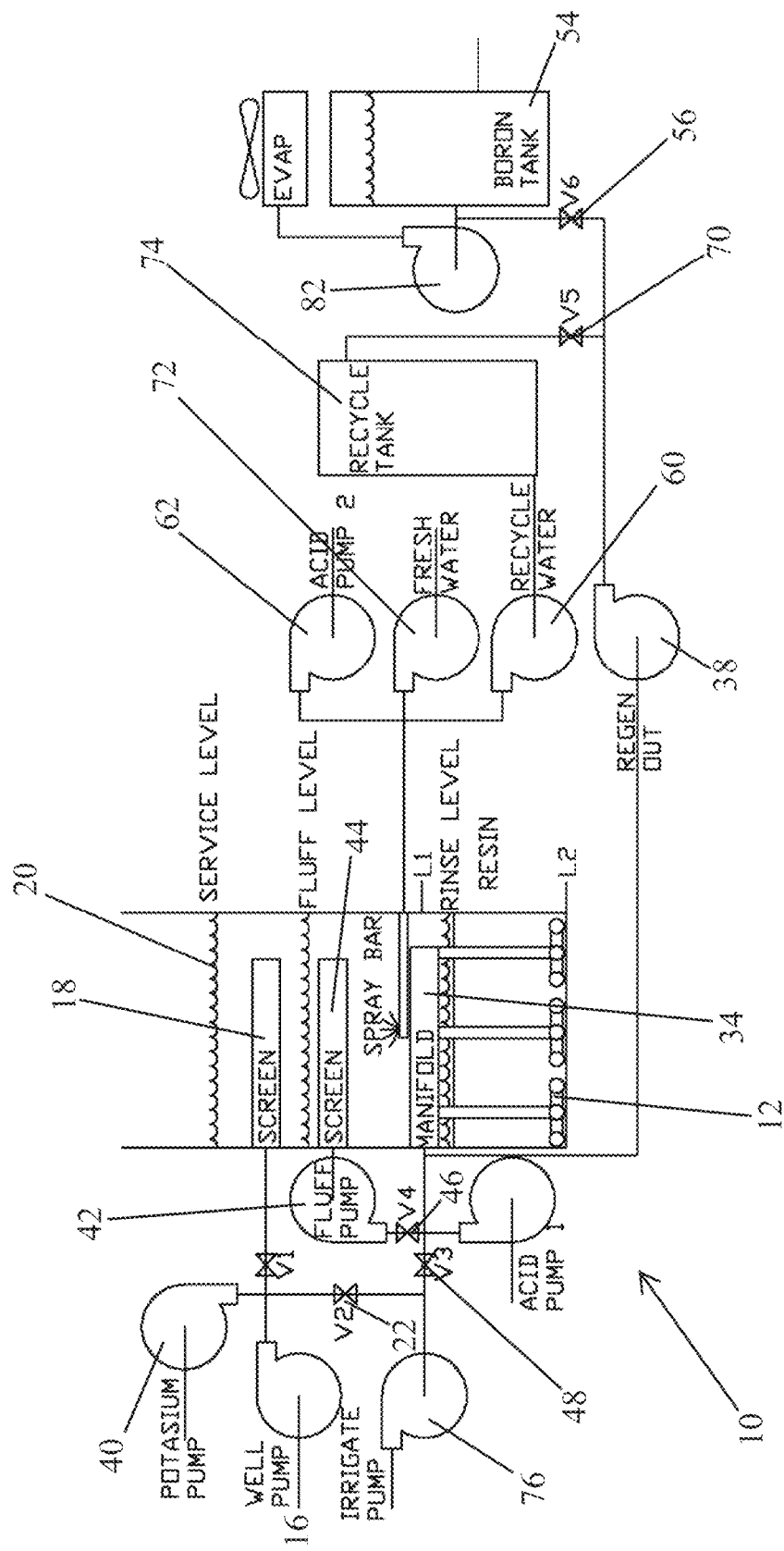
FIG. 3 illustrates a simplified schematic diagram of the apparatus of the present invention.
Figure 4:
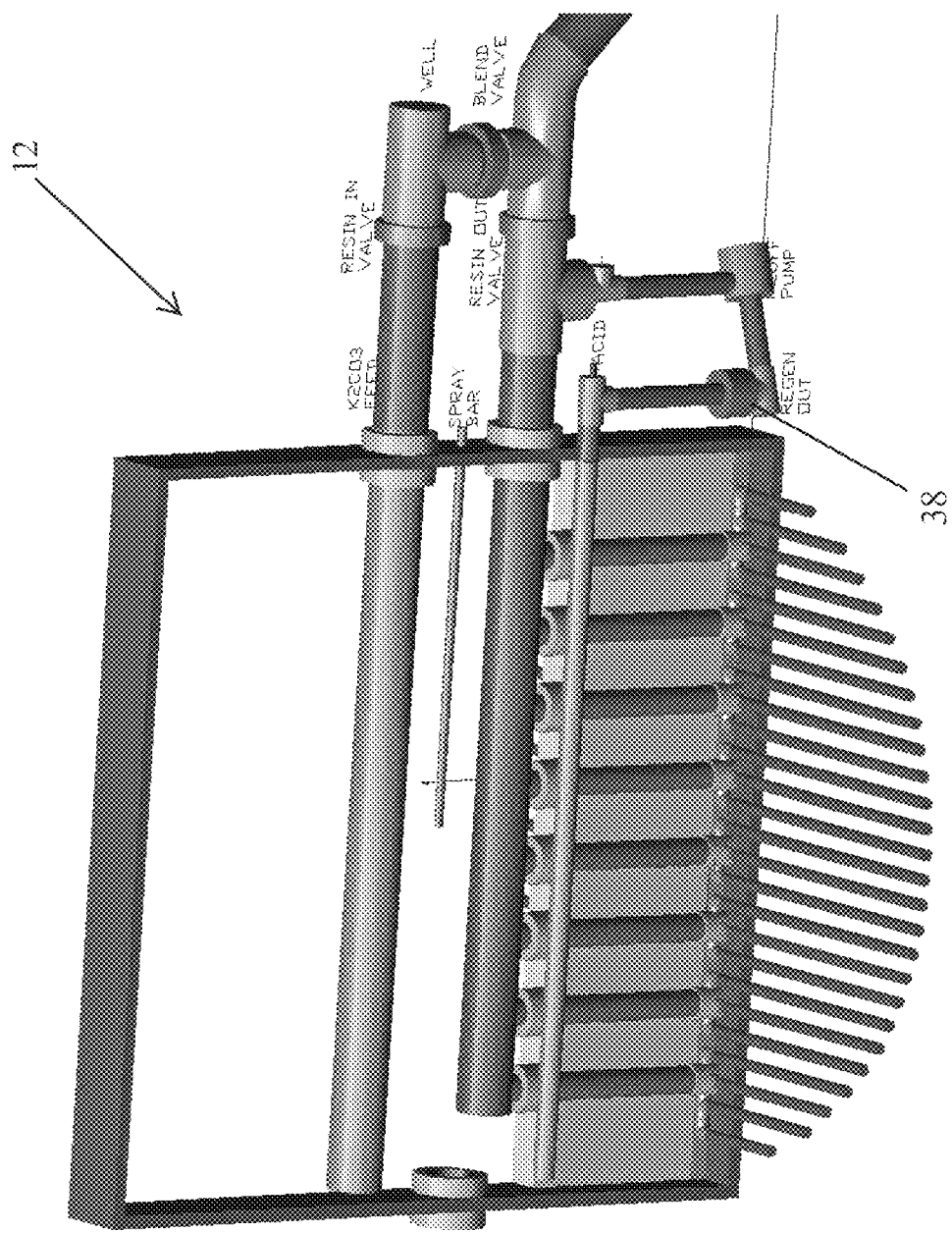
FIG. 4 illustrates a cut away diagram of a portion of the ion exchange vessel of the present invention.

FIG. 2 illustrates a sectional view of an ion exchange vessel 12 for use in the process and apparatus of the present invention. FIG. 3 illustrates a simplified schematic diagram of the apparatus 10 of the present invention. The ion exchange vessel 12 may include a substantially closed container with an open top which is maintained and operated at both ambient temperature and ambient pressure.

Feed water, such as from a subterranean well, moved by a pump is brought to the ion exchange vessel 12, as shown by arrow 14. The feed water may contain boron, such as in the form of calcium borate. The feed water is delivered to a screen, such as a diffuser 18 having slots therein. The diffuser 18 promotes uniform flow across the resin bed (to be described) and minimizes resin agitation in the service mode. The level of water in the service mode is shown by water line 20.

A blend valve 22 permits blending of treated water (to be described) with incoming feed stream water to allow any concentration level of boron between the subterranean well water boron level and the output boron level.

The ion exchange vessel 12 may include a layer of gravel 24 at the base of the vessel with a layer of sand 26 thereon. Well screen pipes 30 are placed near the bottom of the vessel 12 with substantially uniform spacing such that the area of the well screen pipe is similar to the surface area of the bottom of the resin bed. Well screen spacing approximately equal to the perimeter of the well screen pipe may be preferred. The well screens 30 are connected to manifolds 32. The well screen manifolds 32 are connected to a manifold pipe 34 above the level of the resin bed.

The manifold pipe 34 is connected to an irrigation pump 76 having negative pressure, such as a centrifugal pump, to draw or suck the water through the resin in the resin bed and thereafter transport the outgoing water, such as to an irrigation system. The level of water in the resin bed is maintained with a level sensor or sensors 36, which may be connected to a controller (not shown), to adjust opening of valves and speed of pumps.

The boron selective resin in the resin beds contains methylglucamine in salt form, such as sulfate or chloride salt form. The resin is often macroporous polystyrene resin.

Boron may be present in a feed water stream in the form of calcium borate ($CaB_4O_7$). In order to remove boron from the feed water, potassium, ammonium or sodium in hydroxide, carbonate or bicarbonate form is reacted with the feed water. In a preferred embodiment, potassium carbonate ($K_3CO_3$) or ammonium carbonate (($NH_4)_2CO_3$) is delivered to and reacted with a feed stream, such as with a potassium pump 40. A stream having calcium carbonate ($CaCO_3$) and potassium borate salt ($K_2B_4O_7$) or ammonium borate salt (($NH_4)_2B_4O_7$) is thereby formed.

In an optional initial step, potassium, ammonium, or sodium carbonate is supplied by passing a portion of feed water through a water softener resin.

The stream having calcium carbonate and potassium borate salt or ammonium borate salt is introduced to the open top ambient pressure ion exchange vessel 12 and to the resin containing methylglucamine in salt form. Additionally, potassium carbonate or sodium carbonate is added. The borate is formed on the resin and potassium sulfate or sodium sulfate is also formed in the water stream.

The present invention permits higher flow rates per square foot of resin and requires less resin bed depth than heretofore known.

Periodically, the system is switched from a service mode to a regeneration mode so that the boron selective resin in the bed of the ion exchange vessel 12 is periodically regenerated.

In order to regenerate the resin, a level of liquid in the ion exchange vessel 12 is maintained at a water line level 52. The resin bed is drained until the liquid level is just above a fluff level, which operates in conjunction with a screen 44. This serves to minimize the amount of liquid involved in regeneration. A fluff pump valve 46 is activated and the outgoing irrigation pump valve 48 is closed. The fluff pump 42 and an acid pump 50 are turned on.

Liquid is passed through the manifold upward in the ion exchange vessel 12 which releases carbon dioxide ($CO_2$) bubbles from the resin that are generated by addition of the acid. The bed is also fluidized. This is continued until nearly all of the carbon dioxide is released and pH of less than 7 is maintained. In a preferred configuration, the pH is approximately 2.1 to 2.5. Removing the carbon dioxide ($CO_2$) bubbles prevents the regeneration from being compromised. Concentrated sulfuric acid (such as 93%) may be used to minimize volume gain. The overall acid concentration will be less than 1%.

Thereafter, the outgoing pump 38 is turned on to lower the liquid level to the top of the resin in the ion exchange vessel 12. The output is directed to a boron tank 54 past boron tank valve 56. Thereafter, a recycle pump 60 and acid pump 62 deliver water from a recycle tank 64 through a spray nozzle or spray bar above the level of the resin. The acid concentration will be approximately 1% acid. In one example, spray is turned on for a combined flow of about 1 bed volume per 4 hours with an acid concentration of about 1% acid for 30 minutes. This uniformly delivers and applies the liquid to the top of the resin bed. The regen pump 38 is controlled to maintain liquid level just above the resin bed with the level sensors. Thereafter, the acid pump 62 is turned off while recycle pump 60 and regen pump remain on. The boron tank valve 56 is open so that fluid is added to the boron tank.

Thereafter, the recycle pump 60 is turned off, the boron tank valve 56 is closed and a recycle tank fill valve 70 is opened. A fresh water pump 72 is turned on. The regen out pump 38 also remains on. In one example, this continues for about 2 beds of liquid volume. The recycle tank 74 is filled from the top without general mixing to maintain boron concentration gradient. It is preferred that the fresh water has minimal carbonates in order to minimize CO2 bubble formation. Much of the carbonate can be released by reducing the pH level of the water to 7 or less.

If the only water available is the well water itself, optionally filtering the water with a nanomembrane can remove most of the hardness to prevent scaling in the evaporator (to be described) and minimize the amount of carbonates present.

Figure 5:
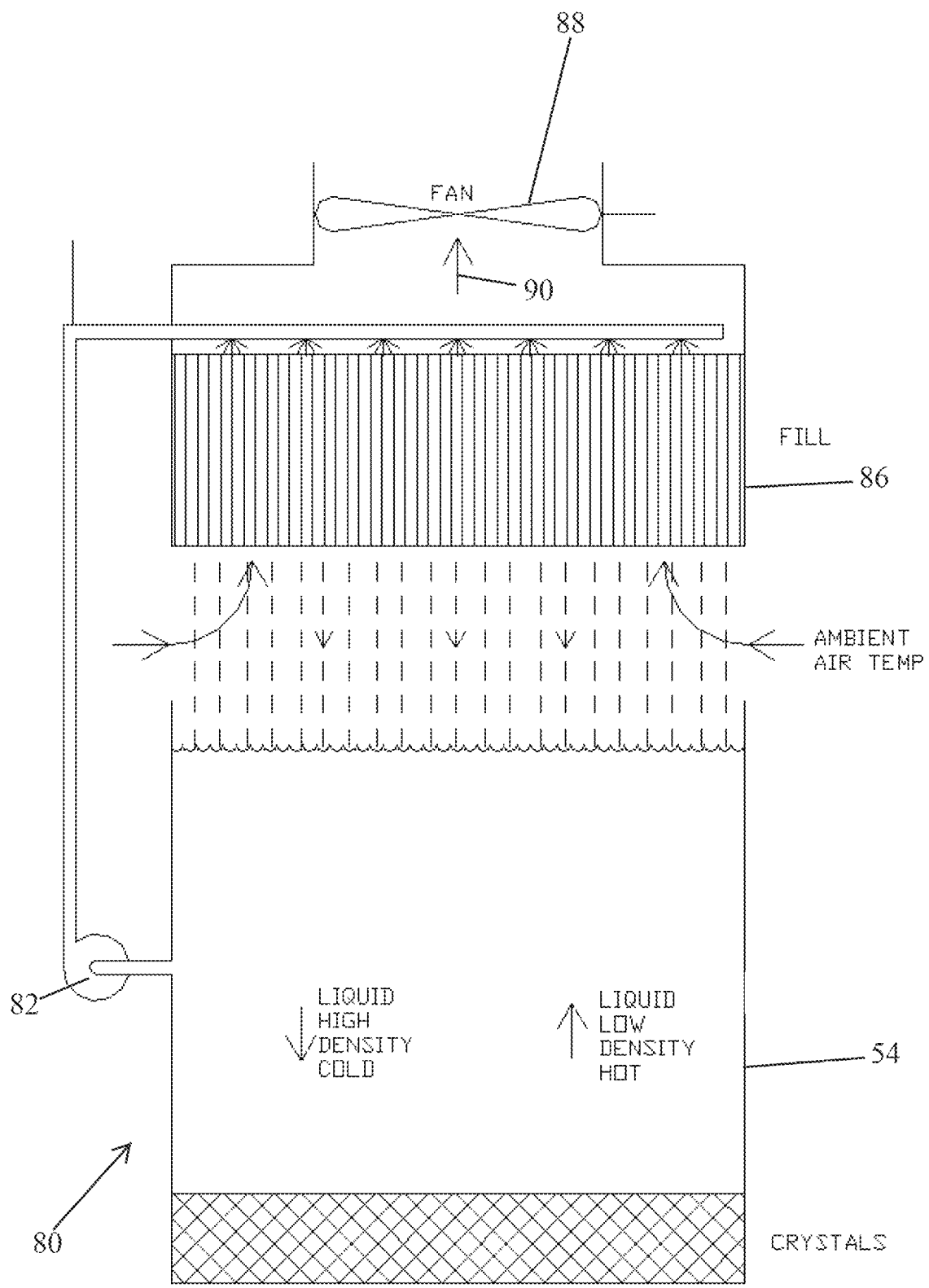
FIG. 5 illustrates a sectional view of an evaporator of the invention.

FIG. 5 illustrates a sectional view of an evaporator 80 used as a part of the invention.

While efficient regeneration of the resin yields a small volume of liquid overall, it still represents a large volume of liquid for an irrigation water treatment system. An inexpensive and simple method of evaporating water is desirable.

The boron tank 54 is in fluid communication with an evaporation pump 82. Fluid in the boron tank 54 is drawn from an upper portion of the tank 54. The liquid is pumped and deposited through a nozzle or nozzles above packing fill 86 which is spaced above the boron tank. The liquid progresses downward by gravity. At the same time, ambient air is drawn upward through the packing fill 86 by a fan 88 as shown by arrow 90.

As liquid progresses downward, evaporation occurs and it becomes more concentrated. The liquid drops fall to the top of the boron tank as droplets. The more concentrated, super saturated colder solution is denser and naturally sinks toward the bottom of the boron tank 54. As crystals form, they are even denser, so they naturally sink and accumulate at the bottom of the boron tank 54, while the less saturated solution floats toward the top of the tank 54. The process only requires a fan 88 and an evaporator pump 82 so it is more energy efficient than known evaporators.

In a preferred embodiment, the invention uses ambient air as the sole heat source. The evaporating liquid temperature is less than ambient air temperature. The invention does not require pressurized or vacuum chambers, chambers, heat exchangers, membranes, compressors, or vacuum pumps. No heat source other than the ambient air is applied to the liquid. The low temperatures and absence of heat exchangers minimizes the chance of fouling. The only energy required is a fan to move the air past liquid in an upward direction while a pump moves the liquid to the top of the packing which progress down as a falling film. In spite of its simplicity, the energy efficiency is similar or higher than complex evaporators.

In an alternate process, a waste heat source, such as diesel exhaust or an air cooled radiator, provides a thermal energy source.

Whereas, the invention has been described in relation to the drawings attached hereto, it should be understood that other and further modifications, apart from those shown or suggested herein, may be made within the scope of this invention.

What is claimed is:

1. A process for regenerating resin in an ion exchange vessel, which process comprises:
   maintaining a level of liquid in an ion exchange vessel having resin;
   pumping acid into said liquid while recirculating to a base of said vessel to percolate through said resin;
   removing carbon dioxide bubbles formed from a top of said vessel;
   removing liquid having borate to a boron tank;
   introducing fresh water to said vessel; and
   removing liquid from said vessel to a recycle tank.

2. The process for regenerating resin as set forth in claim 1 wherein said acid is passing in an upward flow until carbon dioxide is released and resin pH is less than 7.

3. The process for regenerating resin as set forth in claim 1 including the additional steps of spraying rinse water and acid on top of said resin in said vessel and removing said liquid to a recycle tank.

4. The process for regenerating resin as set forth in claim 1 wherein said borate in said boron tank is concentrated.

5. The process for regenerating resin as set forth in claim 1 wherein rinse water from said vessel is added to a recycle tank from the top.

* * * * *